(12) United States Patent
Rancurel et al.

(10) Patent No.: US 8,756,446 B2
(45) Date of Patent: Jun. 17, 2014

(54) MICROPROCESSOR HAVING A LOW-POWER MODE AND A NON-LOW POWER MODE, DATA PROCESSING SYSTEM AND COMPUTER PROGRAM PRODUCT

(75) Inventors: Vianney Rancurel, Toulouse (FR); Vincent Bufferne, Grenoble (FR); Gregory Meunier, Toulouse (FR)

(73) Assignee: Freescale Semiconductor, Inc., Austin, TX (US)

( * ) Notice: Subject to any disclaimer, the term of this patent is extended or adjusted under 35 U.S.C. 154(b) by 253 days.

(21) Appl. No.: 12/933,229

(22) PCT Filed: Apr. 11, 2008

(86) PCT No.: PCT/IB2008/053126
§ 371 (c)(1),
(2), (4) Date: Sep. 17, 2010

(87) PCT Pub. No.: WO2009/125257
PCT Pub. Date: Oct. 15, 2009

(65) Prior Publication Data
US 2011/0035613 A1    Feb. 10, 2011

(51) Int. Cl.
| | |
|---|---|
| *G06F 1/00* | (2006.01) |
| *G06F 1/12* | (2006.01) |
| *G06F 13/42* | (2006.01) |
| *H04L 5/00* | (2006.01) |
| *H04L 7/00* | (2006.01) |
| *G06F 1/04* | (2006.01) |
| *G06F 1/14* | (2006.01) |
| *G06F 5/06* | (2006.01) |

(52) U.S. Cl.
USPC ........... 713/323; 713/322; 713/400; 713/500; 713/501; 713/502; 713/600

(58) Field of Classification Search
USPC .................. 713/322, 323, 400, 500–503, 600
See application file for complete search history.

(56) References Cited

U.S. PATENT DOCUMENTS 5,805,873 A * 9/1998 Roy ............................... 713/502
5,832,283 A   11/1998 Chou et al.
(Continued)

FOREIGN PATENT DOCUMENTS

EP     258838 A2 * 3/1988 ............... G04G 5/00
EP     0565914 B1   11/2001
(Continued)

OTHER PUBLICATIONS

Yoonmyung Lee; Giridhar, B.; Zhiyoong Foo; Sylvester, D; Blaauw, D, "A 660pW multi-stage temperature-compensated timer for ultra-low-power wireless sensor node synchronization," Solid-State Circuits Conference Digest of Technical Papers (ISSCC), 2011 IEEE International , pp. 46,48, Feb. 20-24, 2011.*

(Continued)

*Primary Examiner* — Faisal M Zaman

(57) ABSTRACT

A microprocessor has a low-power mode and a non-low power mode. The microprocessor includes a processor core for executing instructions provided to the microprocessor and a clock providing a clock signal, which in the non-low power mode has a first frequency and in the low power mode has a second frequency lower than the first frequency. A hardware timer is present, for scheduling an execution of an event by the microprocessor at a future point in time. The hardware timer is connected to the clock for determining a period of time between a current point in time and a point in time the event based on a number of clock cycles of the clock signal. A timer controller can determine, when the data processing system switches from the low power mode to the non-low power mode, a number of clock cycles of a clock signal with the first frequency that corresponds to a low-power mode period during which the microprocessor has been in the low power mode and adjusting the hardware timer based on the determined number.

20 Claims, 3 Drawing Sheets

(56) References Cited

U.S. PATENT DOCUMENTS

| | | | |
|---|---|---|---|
| 5,892,959 A | | 4/1999 | Fung |
| 5,966,736 A * | | 10/1999 | Gittinger et al. ............. 711/207 |
| 6,049,886 A * | | 4/2000 | Motoyama .................... 713/400 |
| 6,079,025 A | | 6/2000 | Fung |
| 6,618,456 B1 * | | 9/2003 | Lansdowne .................. 375/354 |
| 6,826,702 B1 * | | 11/2004 | Shibuya ....................... 713/320 |
| 6,839,859 B2 * | | 1/2005 | Kouchi et al. ................ 713/400 |
| 7,006,635 B2 * | | 2/2006 | Parks et al. .................. 380/263 |
| 7,093,153 B1 * | | 8/2006 | Witek et al. .................. 713/600 |
| 7,194,644 B2 * | | 3/2007 | Durand et al. ............... 713/320 |
| 7,496,741 B2 * | | 2/2009 | Lee .................................. 713/1 |
| 7,681,064 B2 * | | 3/2010 | Engler et al. ................. 713/503 |
| 7,844,843 B2 * | | 11/2010 | Freitas .......................... 713/320 |
| 8,046,620 B2 * | | 10/2011 | Fong et al. ................... 713/400 |
| 2002/0004915 A1 | | 1/2002 | Fung |
| 2002/0007463 A1 | | 1/2002 | Fung |
| 2003/0061526 A1 | | 3/2003 | Hashimoto |
| 2004/0193935 A1 * | | 9/2004 | Kato et al. ................... 713/500 |
| 2004/0205369 A1 * | | 10/2004 | Retter et al. ................. 713/400 |
| 2006/0194624 A1 * | | 8/2006 | Hsieh et al. .................. 455/574 |
| 2006/0294520 A1 * | | 12/2006 | Anderson .................... 718/100 |
| 2007/0105525 A1 * | | 5/2007 | Wang et al. ................ 455/343.1 |
| 2007/0190964 A1 * | | 8/2007 | Edwards et al. ........... 455/343.1 |
| 2007/0217562 A1 * | | 9/2007 | Underbrink et al. ............ 377/16 |
| 2007/0234091 A1 * | | 10/2007 | Vishin et al. ................. 713/322 |
| 2010/0037111 A1 * | | 2/2010 | Ziaja et al. ................... 714/744 |

FOREIGN PATENT DOCUMENTS

| | | | | |
|---|---|---|---|---|
| JP | 04223559 A | * | 8/1992 | ............ G06F 15/21 |
| JP | 11272370 A | * | 10/1999 | ............... G06F 1/30 |
| WO | WO 9959252 A1 | * | 11/1999 | ........... H03M 13/12 |
| WO | WO 2010037330 A1 | * | 4/2010 | ........... H04W 52/00 |

OTHER PUBLICATIONS

Shuman, D.I.; Mingyan Liu, "Dynamic clock calibration via temperature measurement," Decision and Control, 2009 held jointly with the 2009 28th Chinese Control Conference. CDC/CCC 2009. Proceedings of the 48th IEEE Conference on , pp. 2082,2087, Dec. 15-18, 2009.*

Schmid, Thomas; Friedman, Jonathan; Charbiwala, Zainul; Cho, Young H.; Srivastava, Mani B., "Low-power high-accuracy timing systems for efficient duty cycling," Low Power Electronics and Design (ISLPED), 2008 ACM/IEEE International Symposium on , pp. 75,80, Aug. 11-13, 2008.*

Renaux, D.P.B.; Pottker, F., "Power Reduction on Embedded Systems Achieved by a Synchronous Finite State Machine Design Technique," Computing System Engineering (SBESC), 2012 Brazilian Symposium on , pp. 71,76, Nov. 5-7, 2012.*

International Search Report and Written Opinion correlating to PCT/IB2008/053126 dated Feb. 27, 2009.

* cited by examiner

MICROPROCESSOR HAVING A LOW-POWER MODE AND A NON-LOW POWER MODE, DATA PROCESSING SYSTEM AND COMPUTER PROGRAM PRODUCT

FIELD OF THE INVENTION

This invention relates to a microprocessor having a low-power mode and a non-low power mode, to a data processing system and to a computer program product.

BACKGROUND OF THE INVENTION

Microprocessors having a low-power mode and a non-low power mode are known in the art. For example, microprocessors are known where during an idle time, the microprocessor is switched to a low power mode. In the low power mode, the clock frequency is lowered relative to the clock frequency in the non-low power mode, i.e. the normal mode. However, lowering of the clock frequency affects the accuracy of the timing and scheduling of events.

SUMMARY OF THE INVENTION

The present invention provides a microprocessor, a data processing system, and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Figure 1:
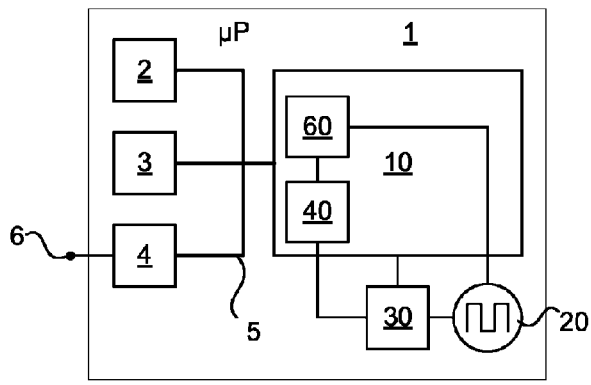
FIG. 1 schematically shows a block diagram of an example of an embodiment of a microprocessor.

Referring to FIG. 1, an example of an embodiment of a microprocessor 1 is shown therein. As shown, the microprocessor 1 may include one or more processor cores 10 for executing instructions provided to the microprocessor 1. The microprocessor 1 may have a low-power mode and a non-low power mode. In the shown example, the microprocessor 1 includes a mode controller 60 which can control the power mode of the microprocessor 1. The low-power mode may for example be a sleep mode in which the processor core is switched off or be an idle mode in which the clock for the processor core is halted and the system clock is operated at a lower clock frequency than in normal mode. In FIG. 1, a single core 10 is shown however the microprocessor 1 may have two or more cores of which the power mode may be controlled individually or together, depending on the specific implementation. The processor core may for instance include the logic required to execute program code in the form of machine code. The processor core 10 may for instance at least include an instruction decoder, an arithmetic unit, an address generation unit, and a load/store unit.

In the shown example, in addition to the core 10, peripherals 2-4 are present which in this example are connected to the core 10 via a bus 5. The microprocessor may for example include, in addition to the processor core, inputs/outputs 301, 302 or other components 32-34, such as and/or communication interfaces and/or coprocessors and/or analog-to-digital converters and/or clocks and reset generation units, voltage regulators, memory (such as for instance flash, EEPROM, RAM), error correction code logic and/or timers or other suitable components.

The example shown in FIG. 1, further includes a clock 20. The clock 20 may provide, when the microprocessor 1 is in operation, a clock signal. The clock signal 20 may for example control the operating speed of the processor core 10 and serve as a time-base for timing and scheduling of operations performed by the microprocessor 1. In the non-low power mode, the clock signal may have a first frequency, from hereon referred to as the high frequency. In the low power mode the clock signal may have a second frequency lower than the first frequency, from hereon referred to as the low frequency. Thus, in the low power mode, a cycle of the clock signal takes a longer period of time than a cycle of the clock signal in the high non-low power mode.

The example shown in FIG. 1, further includes a hardware timer 30. The hardware timer 30 can be used to schedule an execution of an event, such as executing a certain task, by the microprocessor 1 at a future point in time and with a high resolution. As shown, the hardware timer 30 may be connected to the clock 20 for determining a period of time between a current point in time and a point in time the event is scheduled based on a number of clock cycles of the clock signal. It should be noted that a hardware timer may be used to implement a set of a software timers and may be set to expire at the point in time at which the first software timer expires, the first software timer being the software timer in the set that expires first in time. When the hardware timer expires, the hardware timer may be reset and set to expire when the second software timer expires, the second software timer being the software timer in the set that expires first in time after the first software timer.

Figure 4:
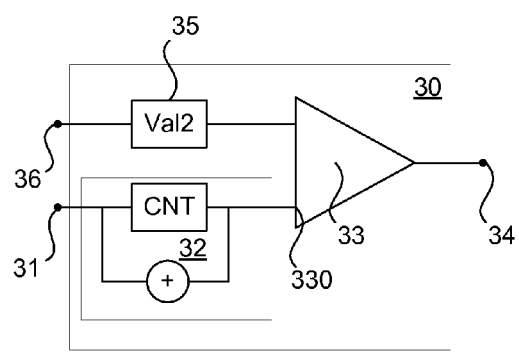
FIG. 4 schematically shows a block diagram of an example of a hardware timer.

The hardware timer 30 may be implemented in any manner suitable for the specific implementation. Referring to FIG. 4, an example of an implementation of a hardware timer 30 is shown. As shown, the hardware timer 30 may include an upcounter 32 which counts the number of clock cycles of a clock signal (e.g. provided by the clock 20) provided at an input 31 to which the upcounter 32 is connected. The upcounter 32 may for example be incremented by 1 for each clock cycle. The upcounter is connected to an input 330 of a comparator 33. Another input 331 of the comparator 33 is connected to a programmable register 35 in which a expire value (Val2) for the hardware timer 30 can be stored. The comparator 33 compares the value of the upcounter 32 with the value stored in the programmable register 35 and outputs at an output 34 of the hardware time 30 a timer expiry signal indicating that the values are equal and hence that the hardware timer 30 has expired; this will wake up the processor.

Referring back to FIG. 1, the microprocessor 1 may further include a timer controller 40. The timer controller 40 may determine, when the data processing system switches from the low power mode to the non-low power mode, a number of clock cycles of a clock signal with the first frequency that corresponds to a low-power mode period during which the microprocessor 1 has been in the low power mode. The timer controller 40 may adjust the hardware timer based on the determined number.

The timer controller 40 may be implemented in any manner suitable for the specific implementation. As shown, the timer controller 40 may be connected to a control input 36 of the hardware timer 30, via which the expiry time of the hardware timer 30 can be controlled. As shown in FIG. 4 the control input 36 may for example be connected to the programmable register 35 and allow programming the value Val2 in the programmable register 35. The timer controller 40 may, as shown in FIG. 1, further be connected to the mode controller 60 to determine the point in time the mode controller switches the microprocessor from the non-low power mode to the low power mode and to determine the point in time the mode controller switches the microprocessor from the low power mode to the non-low power mode. It should be noted that techniques for detecting mode switching are generally known in the art, and for sake of brevity are not described in further detail.

Figure 5:
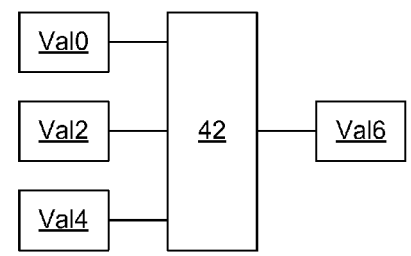
FIG. 5 schematically shows a block diagram of an example of a timer controller.

As illustrated in FIG. 5, the timer controller 40 may include a converter 42 for adjusting a counter value of the counter 32 and/or the expiry time to which he hardware timer 30 is set, based on the number of clock cycles of the clock during the low-power mode period.

In the example of FIG. 5, the converter 42 is connected to one or more memory unit(s) in which the counter value (Val0) at the point in time the microprocessor 1 is switched into low-power mode is stored, as well as the counter value (Val4) at the point in time the microprocessor 1 is switched from the low-power mode into the non-low power mode and the value (Val2) (in number of high frequency clock cycles) to which the hardware timer is set. The converter 42 may determine an adjusted value based on the values stored in the memory unit(s).

Figure 2:
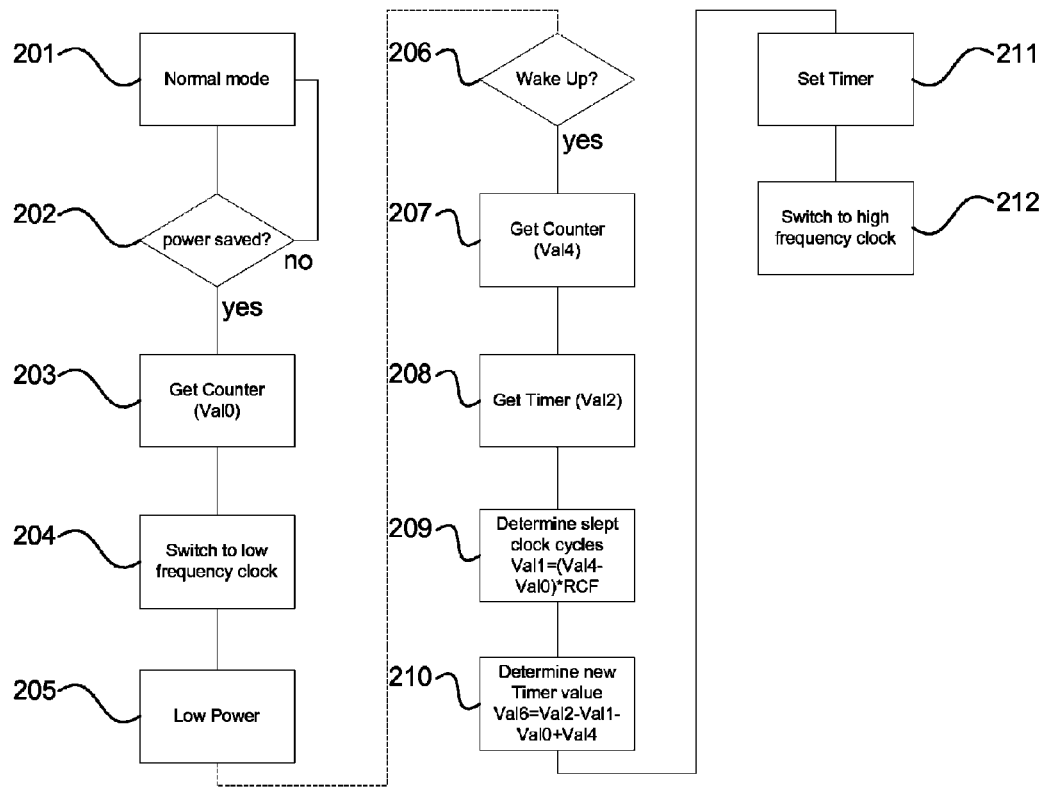
FIG. 2 schematically shows a flow-chart of an example of a method of controlling the mode of a microprocessor.

The adjusted value may be determined in any manner suitable for the specific implementation. For example, the timer controller 40 may execute a method as illustrated in FIG. 2. In the example of FIG. 2, when as indicated with 201 the microprocessor is operating in normal mode, it may be determined whether power can be saved by entering into the low power mode, e.g. by entering an idle mode, as indicated with block 202. If power can be saved: the thread to enter the microprocessor may be executed, and as indicated with block 203 the counter value Val0 may be store; the clock may be switched to the low frequency, as indicated with 204; and the microprocessor 1 may be switched to the low power mode, as indicated with 205. (In FIG. 2, blocks 203-205 are shown connected in series, however it will be apparent that the procedures represented by blocks 203-205 may also be performed (at least partially) simultaneously.)

As indicated with block 206, at some point in time after the microprocessor has been switched to the low power mode 205, the microprocessor 1 may be woken up and switched into the normal power mode. The counter value Val4 at the wake up time may be stored, as well as the original value for the expiry time of the hardware timer 30, as indicated with blocks 207 and 208. As indicated with block 209, from the stored values Val0 and Val4, the number of high frequency clock cycles (Val1)) that corresponds to the number of low frequency clock cycles counted during the low-power mode period For example, the converter 42 or another piece of logic, may determine the change, in this example the increment, in the counter value during the low-power mode period and multiply the obtained value by the frequency ratio (RCF) between the low frequency and high frequency clock. For example, Val1 may be determined by an operation as can be described by the mathematical formulas:

$$Val1 = (V4 - V0)*RCF \qquad (1).$$

Figure 3:
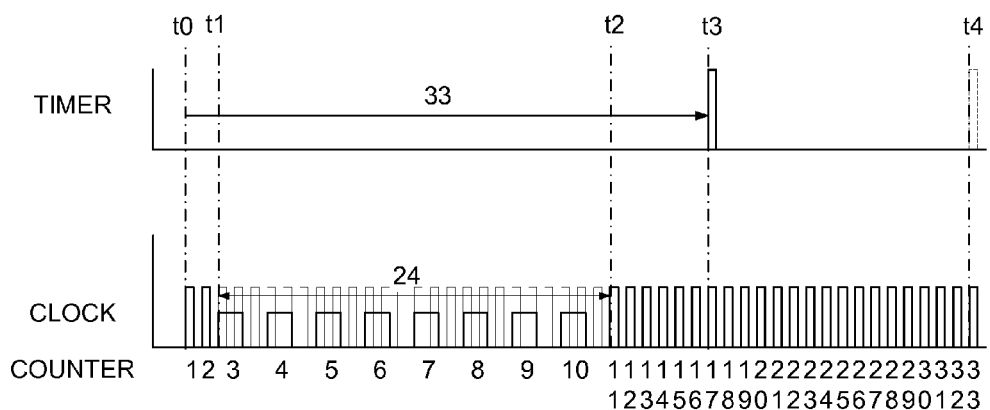
FIG. 3 shows a schematic graph of an example of a timing diagram.

As indicated with block 210, a new timer value Val6 may be determined. As e.g. illustrated in FIG. 3 supposing that the hardware timer is set at time t0 to expire at a time t3 (e.g. expressed in a value Val2 of clock cycles, Val2=33 clock cycles in FIG. 1) and at time t1 (2 high frequency clock cycles after time t0 in FIG. 3) the microprocessor 1 m switched to the low-power mode, in which the clock frequency is 1/RCF times the high clock frequency (RCF>1, and 3 in this example), without compensation the hardware timer will expire at a time t4 different from the set time t3. By adjusting the hardware timer for this effect, the accuracy of the hardware timer may be maintained. The hardware timer may for example be adjusted by adjusting the value Val2 to an adjusted value Val6, which may be determined by performing an operation as can be described by the mathematical formula:

$$Val6 = Val2 - Val1 - Val0 + Val4, \qquad (2)$$

In which Val1 represents the number of high clock frequency cycles corresponding to the low power mode period, and may for example be determined by equation 1.

The hardware timer may be set to the new timer value Val6, as indicated with block 211 and the clock may be switched back to the high frequency clock, as indicated with block 212. Although it will be apparent that other suitable values may be used, in the example of FIG. 3, RCF=3, Val0=2, Val4=10 and Val3=33. Thus, Val1=(10-2)*3=24 while Val3=Val2-Val1=33-24=9, Val5=1 is Val3-Val0=9-2=7 and Val6=Val5+Val4=7+10=17. Thus, by resetting the hardware timer to 17 clock cycles, the hardware timer 30 will expire at the originally intended time t3 and accuracy of the hardware timer can be maintained.

Figure 6:
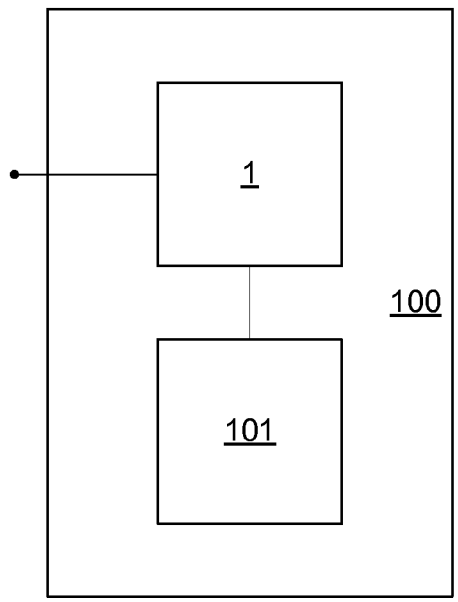
FIG. 6 schematically shows a block diagram of an example of an embodiment of a data processing system.
Figure 7:
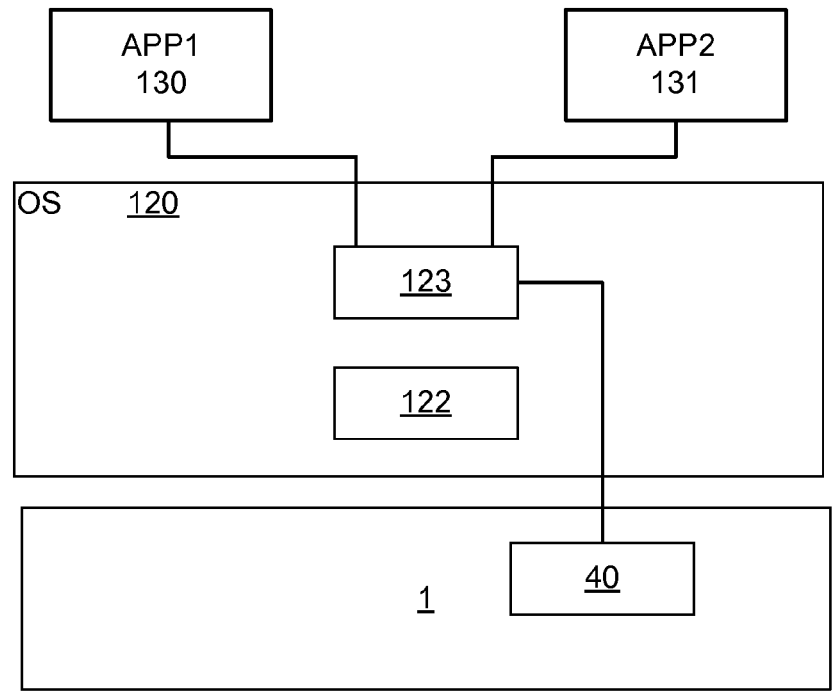
FIG. 7 schematically shows an example of the structure of instructions that can be executed by a microprocessor.

Referring to FIG. 6, an example of a data processing system 100 is shown therein. As shown, the system 100 may include a microprocessor 1. The microprocessor 1 may for example be implemented as shown in the example of FIG. 1. As shown, the data processing system 100 may include a memory 110 may include data. As illustrated in FIG. 7, the data may represent instructions 120 executable by the microprocessor 1. The instructions may include timer control instructions 122 for determining, when the microprocessor 1 switches from the low power mode to the non-low power mode, a number of clock cycles of a clock signal with the first frequency that corresponds to a low-power mode period during which the data processing system has been in the low power mode and adjusting the hardware timer based on the determined number.

Referring to FIG. 7, the instructions may include a set of instructions representing an operating system 120, the operating system forming an interface between the microprocessor 1 and applications 130,131 running on the microprocessor 1; the set may include the timer control instructions. An operating system (OS) is the software that manages the sharing of the resources of a computer or other programmable apparatus and provides programs with an interface used to access those resources. An operating system processes system data and user input, and responds by allocating and managing tasks and internal system resources as a service to users and programs of the system The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program product may for instance include code portions executable by a microprocessor 1. The code portions may include timer control instructions for determining, when the microprocessor 1 switches from the low power mode to the non-low power mode, a number of clock cycles of a clock signal with the first frequency that corresponds to a low-power mode period during which the data processing system has been in the low power mode and adjusting the hardware timer based on the determined number.

The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection or other computer readable media. Such computer readable media may be permanently, removably or remotely coupled to an information processing system such as system 100. The computer readable media may include, for example and without limitation, any number of the following: magnetic storage media including disk and tape storage media; optical storage media such as compact disk media (e.g., CD ROM, CD R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of microprocessor 1 are circuitry located on a single integrated circuit or within a same device. Alternatively, microprocessor 1 may include any number of separate integrated circuits or separate devices interconnected with each other. For example, peripherals 2-4 may be located on a same integrated circuit as the processor core 10 or on a separate integrated circuit or located within another peripheral or slave discretely separate from other elements of system 100. As such, the microprocessor 1 may be embodied in a hardware description language of any appropriate type.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, in FIG. 4 the hardware timer 30 is shown as a single block, however it should be noted that e.g. the counter 32 may be shared with other components of the microprocessor 1 and/or that the counter 32, or other elements of the hardware timer, may be present at another location than e.g. the comparator 33

Also, devices functionally forming separate devices may be integrated in a single physical device. For example, in the example of FIG. 6, the memory 101 may be provided on the same integrated circuit as the microprocessor 1.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A microprocessor having a low power mode and a non-low power mode, said microprocessor comprising:
   a processor core for executing instructions provided to said microprocessor;
   a clock driver for a clock providing a clock signal which in said non-low power mode has a first frequency and in said low power mode has a second frequency lower than said first frequency;
   a hardware timer connected to the clock driver, the hardware timer for scheduling an execution of an event by said microprocessor at a future point in time, and to store a first counter value representing a remaining period of time between a current point in time and the future point in time as a number of clock cycles of said clock signal at the first frequency; and
   a timer controller for storing, in response to said microprocessor switching from said non-low power mode to said low power mode after the hardware timer is started, a second counter value that is a second number of clock cycles at the first frequency from a start point to the current point of time, calculating, in response to said microprocessor switching from said non-low power mode to said low power mode after the hardware timer is started, a third counter value based on the first and second counter values, the third counter value is a number of clock cycles of the clock signal at said second frequency that corresponds to the remaining period of time represented by the number of clock cycles of the clock signal at the first frequency, and storing the third counter value to represent the remaining period of time between the current point of time and the future point in time as the number of clock cycles of the clock signal at the second frequency, wherein the hardware timer is set to expire at the future point in time in response to the third counter value of the hardware timer.

2. The microprocessor as claimed in claim 1, wherein the timer controller to calculate a fourth counter value based on the second and third counter values, wherein the fourth counter value is the third number of clock cycles of the clock signal at said second frequency that corresponds to the same number of clock cycles of the clock signal at the first frequency; and to calculate an adjusted counter value based on the first, second, third, and fourth counter values, the adjusted counter value to represent the remaining period of time between when the microprocessor switches from the low power mode to the non-low power mode and the future point in time, wherein the hardware timer is set to expire at the future point in time in response to the adjusted value of the hardware timer.

3. A microprocessor as claimed in claim 2, wherein said hardware timer includes a counter connected to said clock for counting a counted number of clock cycles of said clock signal.

4. A microprocessor as claimed in claim 3, wherein said timer controller includes a converter for adjusting a counter value of said counter and/or an expiry time to which said hardware timer is set based on said number of clock cycles of said clock during said low power mode period.

5. A data processing system comprising:
   a microprocessor as claimed in claim 3;
   a memory including data representing instructions executable by said microprocessor, said instructions including timer control instructions for determining, when said microprocessor switches from said non-low power mode to said low power mode after the hardware timer is started, a number of clock cycles of the clock signal at said second frequency that corresponds to the remaining period of time represented by the number of clock cycles of the clock signal at the first frequency, and adjusting the value in said hardware timer to represent the remaining period of time between the current point of time and the future point in time as the number of clock cycles of the clock signal at the second frequency, wherein the hardware timer is set to expire at the future point in time in response to the adjusted value of the hardware timer.

6. A data processing system as claimed in claim 5, wherein said instructions include a set of instructions representing an operating system, said operating system forming an interface between said microprocessor and applications running on said microprocessor; said set including said timer control instructions.

7. A microprocessor as claimed in claim 2, wherein said timer controller includes a converter for adjusting a counter value of said counter and/or an expiry time to which said hardware timer is set based on said number of clock cycles of said clock during said low power mode period.

8. A data processing system comprising:
   a microprocessor as claimed in claim 7;
   a memory including data representing instructions executable by said microprocessor, said instructions including timer control instructions for determining, when said microprocessor switches from said non-low power mode to said low power mode, a number of clock cycles of the clock signal at said second frequency that corresponds to the remaining period of time represented by the number of clock cycles of the clock signal at the first frequency, and adjusting the value in said hardware timer to represent the remaining period of time between the current point of time and the future point in time as the number of clock cycles of the clock signal at the second frequency, wherein the hardware timer is set to expire at the future point in time in response to the adjusted value of the hardware timer.

9. A data processing system as claimed in claim 8, wherein said instructions include a set of instructions representing an operating system, said operating system forming an interface between said microprocessor and applications running on said microprocessor; said set including said timer control instructions.

10. A data processing system comprising:
    a microprocessor as claimed in claim 2;
    a memory including data representing instructions executable by said microprocessor, said instructions including timer control instructions for determining, when said microprocessor switches from said non-low power mode to said low power mode after the hardware timer is started, a number of clock cycles of the clock signal at said second frequency that corresponds to the remaining period of time of the number of clock cycles represented by the clock signal at the first frequency, and adjusting the value in said hardware timer to represent the remaining period of time between the current point of time and the future point in time as the number of clock cycles of the clock signal at the second frequency, wherein the hardware timer is set to expire at the future point in time in response to the adjusted value of the hardware timer.

11. A data processing system as claimed in claim 2, wherein said instructions include a set of instructions representing an operating system, said operating system forming an interface between said microprocessor and applications running on said microprocessor; said set including said timer control instructions.

12. A microprocessor having a low power mode and a non-low power mode, said microprocessor comprising:
- a clock driver for clock to provide a clock signal which has a first frequency when the microprocessor is in the non-low power mode and has a second frequency lower than the first frequency when the microprocessor is in the low power mode;
- a hardware timer being connected to the clock, the hardware timer for scheduling an execution of an event by said microprocessor at a future point in time, and to store a first counter value representing a remaining period of time between a current point in time and the future point in time as a number of clock cycles of said clock signal at the first frequency; and
- a timer controller for storing, in response to said microprocessor switching from said non-low power mode to said low power mode after the hardware timer is started, a second counter value that is a second number of clock cycles at the first frequency from a start point to the current point of time, calculating, in response to said microprocessor switching from said non-low power mode to said low power mode after the hardware timer is started, a third counter value based on the first and second counter values, the third counter value is a number of clock cycles of the clock signal at said second frequency that corresponds to the remaining period of time represented by the number of clock cycles of the clock signal at the first frequency, and storing the third counter value to represent the remaining period of time between the current point of time and the future point in time as the number of clock cycles of the clock signal at the second frequency, wherein the hardware timer is set to expire at the future point in time in response to the third counter value of the hardware timer.

13. The microprocessor as claimed in claim 12, wherein the timer controller to calculate a fourth counter value based on the second and third counter values, wherein the fourth counter value is the third number of clock cycles of the clock signal at said second frequency that corresponds to the same number of clock cycles of the clock signal at the first frequency; and to calculate an adjusted counter value based on the first, second, third, and fourth counter values, the adjusted counter value to represent the remaining period of time between when the microprocessor switches from the low power mode to the non-low power mode and the future point in time, wherein the hardware timer is set to expire at the future point in time in response to the adjusted value of the hardware timer.

14. The microprocessor of claim 13, wherein the hardware timer includes a counter connected to the clock, the counter to count a counted number of clock cycles of the clock signal.

15. The microprocessor of claim 14, wherein the timer controller includes a converter to adjust a counter value of the counter and/or an expiry time to which the hardware timer is set based on the number of clock cycles of the clock during the low power mode period.

16. The microprocessor of claim 13, wherein the timer controller includes a converter to adjust a counter value of the counter and/or an expiry time to which the hardware timer is set based on the number of clock cycles of the clock during the low power mode period.

17. A method comprising:
- producing a clock signal which has a first frequency when a microprocessor is in a non-low power mode, and which has a second frequency lower than the first frequency when the microprocessor is in a low power mode;
- scheduling, by a hardware timer, an execution of an event by the microprocessor at a future point in time;
- determining a period of time between a start point in time and the future point in time of the event based on a number of clock cycles of the clock signal at the first frequency;
- storing the number of clock cycles in the period of time as a first counter value;
- storing a second counter value in response to the microprocessor being switched from the non-low power mode to the low power mode, wherein the second counter value is a second number of clock cycles at the first frequency from the start point;
- storing a third counter value in response to the microprocessor being switched from the low power mode to the non-low power mode, wherein the third counter value is a third number of clock cycles at the second frequency while the microprocessor was in the low power mode;
- calculating a fourth counter value based on the second and third counter values, wherein the fourth counter value is the third number of clock cycles of the clock signal at said second frequency that corresponds to the same number of clock cycles of the clock signal at the first frequency; and
- calculating an adjusted counter value based on the first, second, third, and fourth counter values, the adjusted counter value to represent the remaining period of time between when the microprocessor switches from the low power mode to the non-low power mode and the future point in time, wherein the hardware timer is set to expire at the future point in time in response to the adjusted value of the hardware timer.

18. The method of claim 17, further comprising:
counting, by a counter of the hardware timer, a counted number of clock cycles of the clock signal.

19. The method of claim 17, further comprising:
adjusting, by a converter of the timer controller, a counter value of the counter and/or an expiry time to which the hardware timer is set based on the number of clock cycles of the clock during the low power mode period.

20. The method of claim 17, further comprising:
adjusting a stored value to an adjusted value the determined number of clock cycles;
comparing a value of the hardware timer to the adjusted value; and
determining that the hardware timer has expired when the value of the hardware timer matches the adjusted value.

* * * * *